United States Patent [19]

Stalder et al.

[11] Patent Number: 4,522,224

[45] Date of Patent: Jun. 11, 1985

[54] GATE VALVE CONSTRUCTION

[75] Inventors: Hans Stalder; Hans Sidler, both of Eschenbach, Switzerland

[73] Assignee: Sistag, Maschinenfabrik Sidler Stalder AG, Switzerland

[21] Appl. No.: 622,219

[22] Filed: Jun. 19, 1984

[30] Foreign Application Priority Data

Jun. 24, 1983 [CH] Switzerland ............... 3455/83

[51] Int. Cl.³ .................. F16K 3/30; F16K 25/00
[52] U.S. Cl. ................... 137/242; 251/328; 137/244
[58] Field of Search ............ 137/242, 244; 251/326, 251/328; 15/256.5

[56] References Cited

U.S. PATENT DOCUMENTS

| 2,001,271 | 5/1935 | Smith | 137/244 |
|---|---|---|---|
| 2,669,416 | 2/1954 | Hilton | 251/328 |
| 2,982,295 | 5/1961 | Williams | 137/242 |
| 3,207,471 | 9/1965 | Williams | 251/328 |
| 4,112,969 | 9/1978 | Still | 251/328 |
| 4,201,365 | 5/1980 | Paptzun et al. | 251/328 |
| 4,429,710 | 2/1984 | Grieves et al. | 137/242 |

FOREIGN PATENT DOCUMENTS 2108632  5/1983  Switzerland ............... 251/328

*Primary Examiner*—George L. Walton
*Attorney, Agent, or Firm*—McGlew and Tuttle

[57] ABSTRACT

The slanted closing rim of a valve plate includes a cylindrical portion at the rear side, having a diameter D1 which corresponds to the width of the plate and slightly exceeds the diameter D3 of the passage throat. A groove in the casing guides the narrow sides of the valve plate and accomodates a seal strip. The grooves partly closed at the front side by a guide strip which in the bottom zone of the passage throat is a semicircularly extending strip. The inside diameter D4 of this cylindrical strip approximately corresponds to that of the valve plate and its axis a extends at a level which is higher by half the difference between diameters D1 and D3 than that of the axis b of the throat passage. A slanted closing rim of the valve plate is provided with shear arcs on its frontal points on each of the side edges. The two shear arcs form a kind of a plowshare deflecting the medium from the seal.

2 Claims, 5 Drawing Figures

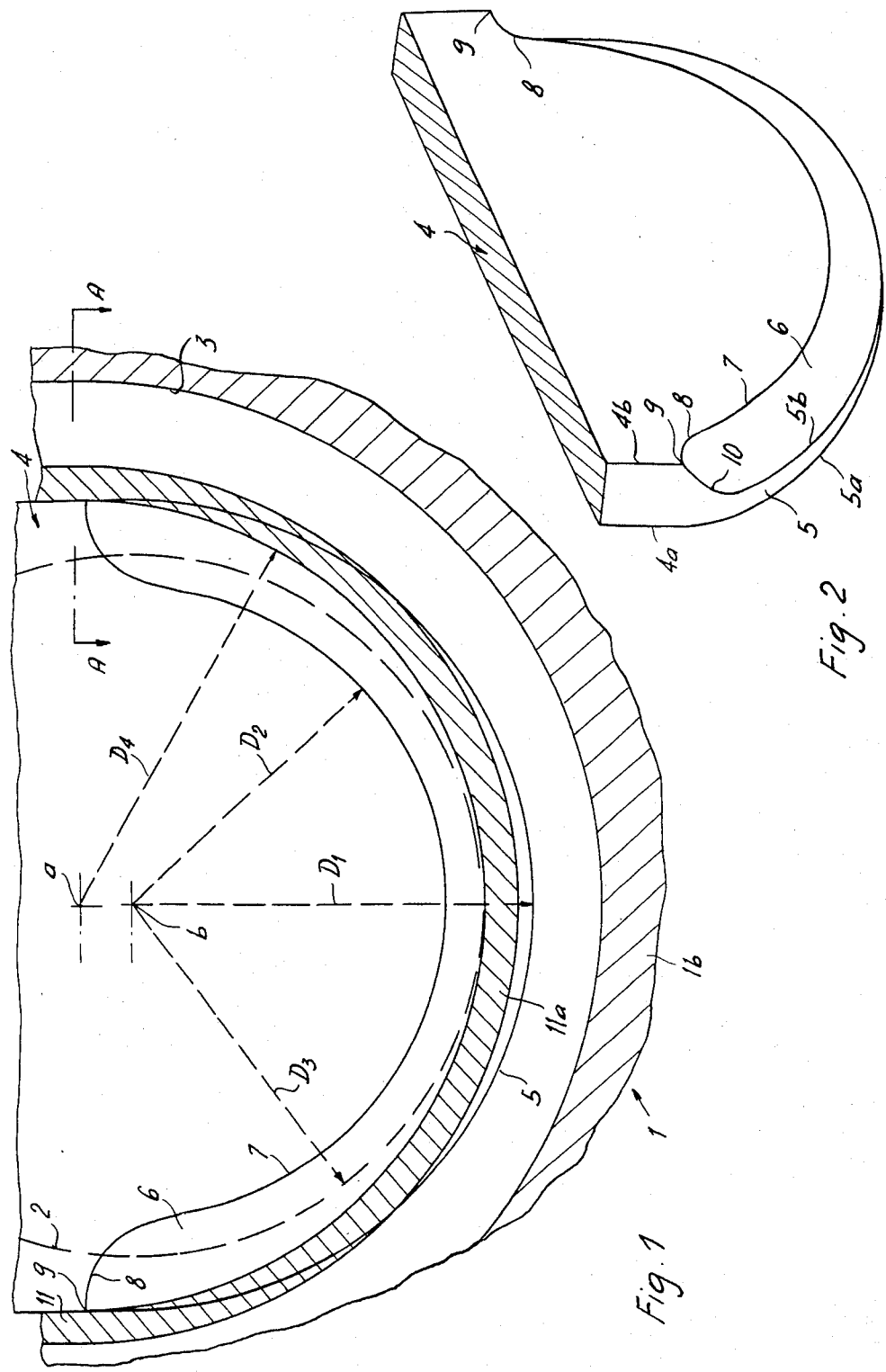

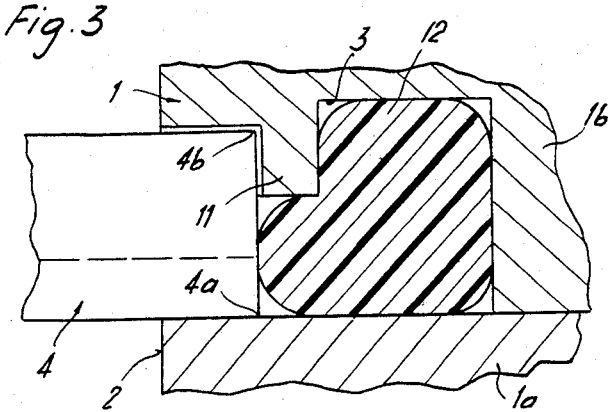
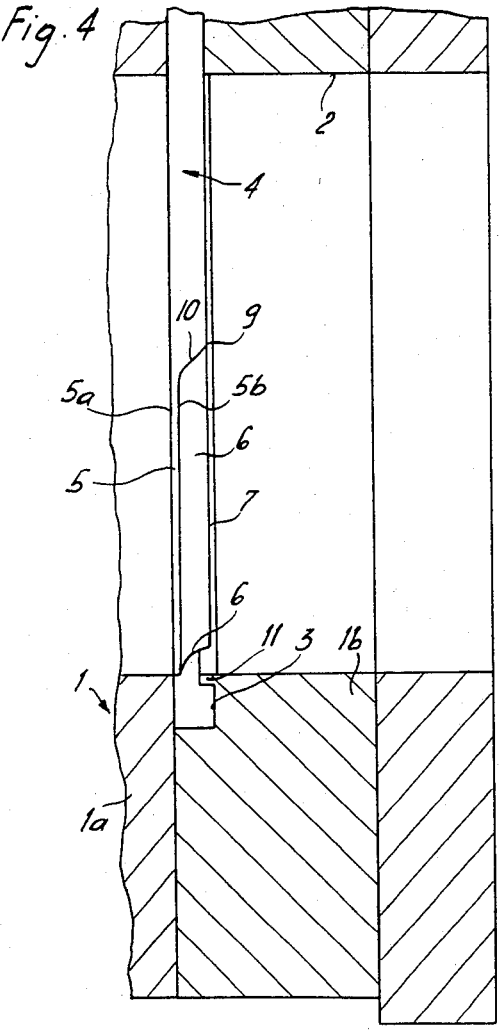
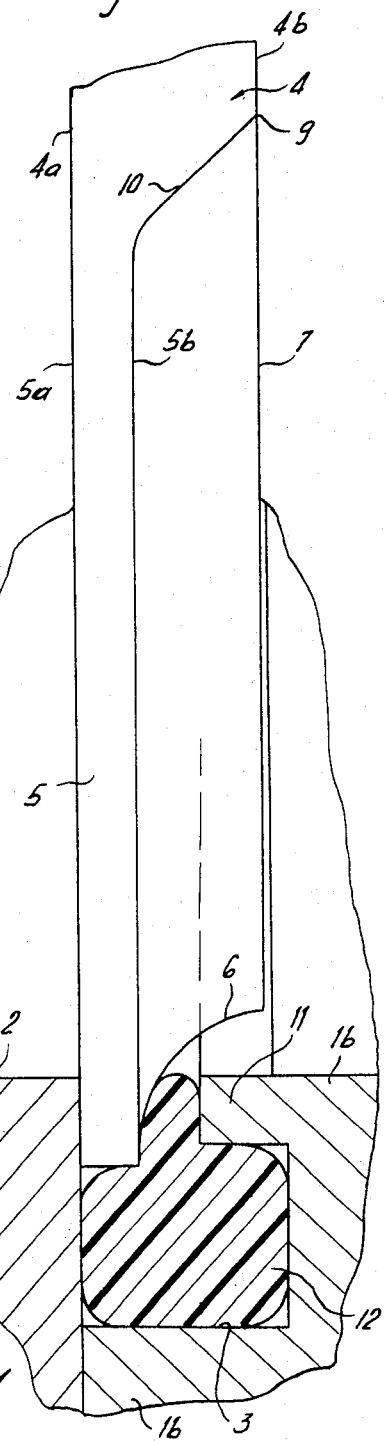

GATE VALVE CONSTRUCTION

FIELD AND BACKGROUND OF THE INVENTION

This invention relates in general to the construction of valves and in particular to a new and useful gate valve having the construction to effect shearing off and removing of deposits of media.

Prior art gate valves of this kind have the drawback that when employed in pipe lines for conveying finely divided, granular, or solid particles containing fluids, difficulties may be experienced with closing the valve plate, since particles may accumulate in the guide grooves and jam the plate. To avoid this disturbance, it has already been provided to make the diameter of the lower circular closing rim of the valveplate larger than the width thereof, and thus also much larger than the diameter of the passage throat of the valve, to obtain that the closing edges on the front side, as well as the transverse edges at the location where the closing edges meet the narrow sides in the zone of the lateral guideways, may become effective as shear edges by which particles which might have deposited in the guideways would be pushed downwardly during the closing operation. This, however, requires the provision of pockets in the guide grooves laterally of the lower zone of the throat, in which particles from the conveyed medium and which are difficult to rinse out, may accumulate with time.

SUMMARY OF THE INVENTION

To eliminate such drawbacks, the present invention is directed to a gate valve equipped with a valve plate which is capable of satisfactorily shearing off and removing deposits of media particles in guide grooves, while avoiding the pockets, and in spite of the fact that the closing rim exactly corresponds to the width of the plate.

In accordance with the invention, a gate valve comprises a casing which is made up of first and second abutting cylindrical parts which form a throat passage having a throat passage diameter. A groove is defined between the parts which has a groove diameter. A valve plate is mounted for opening and closing movement into and out of the groove and the throat passage and has a planar side edge on each side and an end portion with a semicylindrical rim defining a closing edge portion engageable in the groove. The front side face has a concave recess which extends inwardly from the rim and joins each front side planar side edge in a curved portion which defines concave shear areas. A resilient steel is arranged in the groove and a guide strip overlies the seal in the groove on a side opposite to the valve plate rim. When the valve plate enters the groove the rim engages into the seal member in a portion thereof which does not underlie the guide strip.

The valve plate projects by its narrow-side, not stepped-off edges, into the guide grooves of the casing, to a depth which amounts in the zone of the central axial plane of the throat to only some millimeters, and is guided on the casing in the rear portion of its narrow side edge by a metallic guide strip, while the front portion of the narrow-side edge cooperates with the sealing material which is retained in the guide groove by the projecting guide strip. It would now be suggestive to design this guide strip in the bottom zone of the throat as a semi-cylindrical surface having a diameter corresponding to the width of the plate and having its center at the level of the throat axis. However, since advantageously, the stepped off closing rim of the valve plate is to apply only against the sealing material and not against the metallic guide surface of the casing, and in addition, as far as possible, the formation of pockets in the lower portion of the throat is to be avoided, a development of the invention provides that narrow sides which are parallel to each other are guided lengthwise by corresponding surfaces of a guide strip which partly closes the casing groove at the front side, which guide strip is continuous in the zone of the lower portion of the throat in the form of a cylindrically extending strip, with the axis a of the cylindrical inside surface of this strip tangent to the lower circumference of the throat extending at a level which is higher by half the difference between the plate width and the throat diameter $D_3$, than the level of the throat axis b. This makes sure that this cylindrical surface is just tangent to the cylindrical surface of the throat in the lower central zone, and only pockets of small depth and shallowing out to zero are formed between the central axial plane of the throat and the mutually parallel surfaces of the guide strips.

The result is that in its lower central zone, the throat is not interrupted substantially by any step, and the closing edge portion at the rear side of the valve plate is pressed satisfactorily against the sealing material, without contacting the metallic portions of the casing. On the other hand, during the closing operation, any deposits on the side guide surfaces can reliably be stripped downwardly by the shear arcs provided both on the front side and laterally, where they are entrained and cannot be compacted into any pockets.

Accordingly it is an object of the invention to provide an improved valve which has means for dislodging media particles from the valve plate.

A further object of the invention is to provide a gate valve which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a partial radial sectional view of the casing and the valve plate shown in a closed position and constructed in accordance with the invention;

FIG. 2 is a perspective view on a smaller scale of the valve plate of FIG. 1;

FIG. 3 is an enlarged section taken along the line A—A of FIG. 1;

FIG. 4 is an axial sectional view of a portion of the casing, with the valve plate not quite closed, and FIG. 5 is an enlarged view similar to FIG. 4, with the valve plate completely closed.

DESCRIPTION OF THE PREFERRED EMBODIMENT

Referring to the drawings in particular the invention embodied therein comprises a gate valve having a casing 1 which defines a throat passage 2 having a groove defined therein into which a gate valve plate 4 is movable to effect opening and closing of the throat area.

The shown gate valve comprises a two part casing 1 having a cylindrical passage throat 2. The two casing parts 1a, 1b firmly connected to each other bound a guide groove 3 which is provided therebetween and in which the valve plate 4 is guided in a manner known per se. On its vertical narrow sides, valve plate 4 is limited by mutually parallel planar edges 4a,4b and, on its bottom side, by a connecting curved or semicylindrical rim 5,6 which is the closing portion conformable to the tubular conduit to be shut off. This rim comprises a projecting edge portion 5 having a diameter D1 corresponding to the width of the plate between edges 4a and 4b, and being slightly larger, for example by 3 mm, than the diameter D3 of the passage throat of the casing. Diameter D2 of a rim edge or front side lower edge which is formed by a concave recess 6 provided in valve plate 4 at the front side of closing edge portion 5, is smaller than diameter D3 of passage throat 2, by 2 mm for example.

Due to the provided front concave recess 6, edge portion 5 of the bottom rim of valve plate 5 is limited on its front side by an inner edge 5b, while being limited on its rear side by an outer edge 5a blending with outer edges 4a. The end portions of rim edge 7 form concave shear arcs 8, 8 at each side curving outwardly to an intersection 9 with frontal side edge 4b of the plate. From the other side, the end portions of inner edge 5b of rim 5 also form oppositely curving shear arcs 10, 10 which connect to intersection 9.

The narrow side edges of the plate are guided lengthwise, with only little play, at front side of the groove 3 where a guide strip 11 projects from the groove wall and partly closes the groove. A seal strip 12 is held in place in groove 3 by guide strip 11 and is or comes during the closing operation into contact with only the rear portion of the narrow side edges of the valve plate 4. In the bottom zone of passage throat 2, strip 11 extends circularly, i.e. forms a cylindrical wall 11a having its axis a at a level which is higher by half the difference between diameters D1 and D3, than the level of axis b of throat 2.

While closing valve plate 4, shear arcs 8 and 10 work at the front side and the side edge sides, respectively, as scrapers cleaning guide groove 3 from deposited particles. During the closing operation, such particles which have been pushed downwardly and forward, are then entrained by the medium flowing therethrough. Since the provided dimensions, particularly the relation between the diameters, are such that only crescent-shaped pockets of small depth and shallowing out toward the bottom center of the throat are formed by groove 3 and seal strip 12 received therein, no clogging of the valve plate guideway can be expected in practice. With the closing operation accomplished, the projecting bottom portion 5 of the plate rim engages through the correspondingly compressed seal strip 12 the central bottom portion 11a of strip 11, to a depth increasing toward the center, due to the difference in diameters D1 and D3 (FIGS. 1 and 5), so that a satisfactory closing of passage throat 2 is ensured.

The two shear arcs 8, 10 intersecting at 9 form a sort of a plowshare. During the closing operation, particles which might have deposited on the sealing material are stripped off and entrained by the flowing medium. Troubling deposits in the guide groove of the gate 12 and on the sealing element are thereby reliably avoided.

According to the invention, a gate valve comprises a casing having a cylindrical throat passage, a groove defined in the throat passage and a valve plate movable perpendicular to the throat passage and guided in the groove. A sealing material is disposed in the groove, the valve has a circular rim with a closing rim portion which is stepped off in a direction of the plate thickness and includes a radially projecting semicylindrical portion of the closing rim which has a diameter D1 which corresponds to the width of the plate and exceeds the diameter of the throat D3 and merges by its outer rear edge continuously with the corresponding edges of the narrow side of the plate. The valve plate has a radially reset front edge with a diameter D2 which is smaller than the diameter D3 of the throat and the radially reset rim edge has end portions on a front side of the valve plate which extends substantially parallel with the semicylindrical edge portion and set at an angle with corresponding edge of the narrow side of the plate while forming front side shear arcs, the end portions of the inner edge of the semicylindrical rim portion extends obliquely upwardly to a point of intersection of the front side shear arcs with an edge of a narrow side of the plate while forming narrow side shear arcs.

What is claimed is:

1. A gate valve comprising:
    a casing (1) having a throat passage (2) with a guide groove (3) therein, said casing having a guide strip (11) covering a front portion of said guide groove;
    a seal strip (12) in said guide groove; and
    a valve plate (4) movable perpendicularly to said throat passage in said guide groove and against said seal strip, said plate having a front surface with a curved front lower edge (7), a rear surface with a curved rear lower edge (5a), opposite planar narrow sides each having parallel front edges (4b) and rear edges (4a), said rear edges connected to said rear lower edge, a lower rim (5) defined between said rear lower edge (5a) and a curved lower inner edge (5b), and a curved concave recess (6) defined between said front lower edge (7) and said inner edge (5b), said front lower edge (7) having concavely curved shear arches (8) extending outwardly into contact with a lower end of said front parallel edges (4b) at an intersection (9), said inner edge (5b) having concavely curved shear arches (10) curving upwardly into contact with said intersections (9), said front lower edge (7) having a smaller diameter than said inner edge (5b), and at least a portion of said seal strip (12) being deformed into said concave recess (6) when said lower rim (5) engages said seal strip (12) to provide an effective seal between said valve plate (4) and the casing (1).

2. A gate valve according to claim 1, wherein seal strip (12) includes a portion extending into a space between said guide strip (11) and a rear portion of said guide groove (3), said valve plate (4) movable into engagement with said portion of said steel strip for closing said throat passage (2).

* * * * *